(12) United States Patent
Jiang et al.

(10) Patent No.: US 12,318,927 B2
(45) Date of Patent: Jun. 3, 2025

(54) HIGH-ACCURACY SNAKE ARM WITH LARGE LOAD AND LONG-DISTANCE RADIATION RESISTANCE

(71) Applicant: HUNAN UNIVERSITY, Changsha (CN)

(72) Inventors: Chao Jiang, Changsha (CN); Zhao Wang, Changsha (CL); Wanyi Tian, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/693,514

(22) PCT Filed: Aug. 19, 2022

(86) PCT No.: PCT/CN2022/113453
§ 371 (c)(1),
(2) Date: Mar. 19, 2024

(87) PCT Pub. No.: WO2023/045647
PCT Pub. Date: Mar. 30, 2023

(65) Prior Publication Data
US 2024/0391090 A1    Nov. 28, 2024

(30) Foreign Application Priority Data
Sep. 23, 2021  (CN) .......................... 202111111441.5

(51) Int. Cl.
  *B25J 9/06* (2006.01)
  *B25J 9/00* (2006.01)
  *B25J 9/10* (2006.01)
(52) U.S. Cl.
  CPC ............. *B25J 9/065* (2013.01); *B25J 9/0078* (2013.01); *B25J 9/104* (2013.01)

(58) Field of Classification Search
CPC . B25J 9/065; B25J 9/0078; B25J 9/104; B25J 9/003; B25J 9/0063
See application file for complete search history.

(56) References Cited

U.S. PATENT DOCUMENTS 5,103,403 A    4/1992  Logabex
2014/0330432 A1*  11/2014  Simaan .................. B25J 9/1625
                                                                   700/250
(Continued)

FOREIGN PATENT DOCUMENTS

CN        1470359 A  *  1/2004
CN      107486849 A     12/2017
(Continued)

OTHER PUBLICATIONS

International Search Report of PCT/CN2022/113453.

*Primary Examiner* — Bobby Rushing, Jr.

(57) ABSTRACT

The present invention provides a high-accuracy snake arm with large load and long-distance radiation resistance, which includes a driving base body and a snake shaped arm, where the snake shaped arm is composed of parallelly-connected joints connected in series, which includes a plurality of identical movable linkages connected in parallel, each of the parallelly-connected joints further includes platforms; when one of the platforms at the two ends of the plurality of identical movable linkages connected in parallel is fixed, the other platform performs translation motion along a circle relative to the fixed platform. The movable linkage includes at least a link; and a plurality of driving units are installed in the driving base body, each driving unit is respectively connected to each link in the parallelly-connected joint via a steel wire rope.

10 Claims, 3 Drawing Sheets

(56) References Cited

U.S. PATENT DOCUMENTS

2017/0239820 A1* 8/2017 Ohta ..................... B25J 9/0069
2018/0304458 A1* 10/2018 Takagi ................... B25J 18/06

FOREIGN PATENT DOCUMENTS

| CN | 108393876 | A | | 8/2018 | |
|----|-----------|---|---|--------|---|
| CN | 109176488 | A | * | 1/2019 | ............. B25J 17/00 |
| CN | 109955281 | A | | 7/2019 | |
| CN | 111421531 | A | | 7/2020 | |
| CN | 111993398 | A | | 11/2020 | |
| CN | 109955235 | B | * | 12/2020 | .......... B25J 19/0095 |
| CN | 112936271 | A | | 6/2021 | |
| CN | 113733067 | A | | 12/2021 | |
| EP | 0073598 | | | 3/1983 | |

* cited by examiner

HIGH-ACCURACY SNAKE ARM WITH LARGE LOAD AND LONG-DISTANCE RADIATION RESISTANCE

RELATED APPLICATION

This application is the national phase under 35 U.S.C. § 371 of PCT international application No. PCT/CN2022/113453, which has an international filing date of Jul. 12, 2021, which claims the priority of Chinese invention patent application No. 202111111441.5, titled "HIGH-ACCURACY SNAKE ARM WITH LARGE LOAD AND LONG-DISTANCE RADIATION RESISTANCE" filed on Sep. 23, 2021. The content of the above identified applications are hereby incorporated in its entireties by reference for all purposes.

FIELD OF THE INVENTION

The present invention belongs to the field of snake robotic arms, and in particular relates to a high-accuracy snake arm with large load and long-distance radiation resistance.

BACKGROUND

The snake arm is a kind of snake shaped robotic arm, which has the characteristics of high degree of freedom, flexible motion and strong adaptability and so on. It is widely used in complex and cramped space and multi-obstacle structure environment. It can be installed with a camera and a laser head at its end to complete work such as detection, welding and other tasks in the complex and cramped environment instead of human bodies, and it has a very broad application prospect. In some specific scenarios, such as nuclear radiation environment, higher requirements are put forward for the snake arm, not only to achieve the most basic motion function, but also to require a large load and distance, at the same time, to require the snake arm has radiation-resistant characteristics, otherwise it would not be adapted to the extreme environment such as nuclear radiation.

At present, a variety of snake arms have been developed at home and abroad, which mainly include four types: the first one is driven by a motor at the joint, the second one is driven by a hydraulic cylinder at the joint, the third one is driven by an air cylinder at the joint, and the fourth one is driven by a rope to drive the joint for motion, however, these snake arms have some disadvantages and deficiencies. For example, as for the joint of a snake robot in an invention CN 107175682 B, it is driven by a motor contained in the joint. Although its control accuracy is high, due to the limitation of space and the performance of the motor, the number of joints cannot be excessive and the load capacity is small, and the robot is not resistant to radiation because the electronic devices such as the motor are easily damaged in the radiation environment. Invention CN 112894782 discloses a snake robot, which uses a hydraulic cylinder to drive a joint, and exerts a large load, however the structure thereof is complicated and bulky, which is not suitable for narrow space operations, and a sealing element in the hydraulic cylinder is easily damaged in a radiation environment, so that the robot is not resistant to radiation. Invention CN 110861075 discloses a snake robotic arm, which uses a cylinder to drive a joint, and exerts a small load, since the motion of the cylinder is difficult to be accurately controlled, the accuracy thereof is also not high, and the sealing element in the cylinder is vulnerable to damage in a radiation environment, therefore the robot is not resistant to radiation. Invention CN 111113390 discloses a snake robot, in which a motor is centrally placed in a driving box, and a rope is used to drive a joint to achieve motion, where the joint is of a pure mechanical structure and can work normally under a radiation environment, and the robot can endure radiation; however, a joint link itself is used as a fixed channel, and thus, when the joint moves, all the ropes passing through the joint will be affected, resulting in coupling between the motions of various joints, and the motion control is complicated and has a large error, so that the motion accuracy of the robot is low. Invention CN 107486849 A discloses a snake arm, in which the arm body is formed by a plurality of links connected in series, and each two adjacent links are movably connected via a cross-shaft joint; however, four cables jointly control the rotation of a cross-shaft joint, rather than independently controlling each link between the joints, inducing that the flexible motion of the robot cannot be realized, and the motion range is small; and the same cable using the joint link itself as a fixed channel will result in coupling between the motions of each joint, and the motion accuracy is low.

SUMMARY

The present invention provides a high-accuracy snake arm with large load and long-distance radiation resistance, where a steel wire rope is driven by centrally distributed motors to drive each parallelly-connected joint to realize the motion of the snake arm, and eliminate the motion coupling between each joint to solve the problems existing in the above-mentioned snake arm robot.

In order to achieve the above objective, the technical solution of the present invention provides a high-accuracy snake arm with large load and long-distance radiation resistance, wherein the high-accuracy snake arm includes a driving base body and a snake shaped arm with one end connected to the driving base body and composed of parallelly-connected joints connected in series, and the parallelly-connected joints are respectively referred to as a first joint, a second joint, ..., and an $N^{th}$ joint according to the distance from the driving base body, wherein N is an integer greater than or equal to 1; each parallelly-connected joint includes m identical movable linkages connected in parallel, and m is an integer greater than or equal to 3; each of the parallelly-connected joints further includes platforms respectively connected to two ends of the m identical movable linkages connected in parallel; when one of the platforms at the two ends of the m identical movable linkages connected in parallel is fixed, the other platform performs translation motion along a circle relative to the fixed platform, and the two adjacent platforms always remain to be parallel with each other; and a plurality of driving units are installed in the driving base body, each driving unit is respectively connected to each link in the parallelly-connected joint via a steel wire rope, and each steel wire rope is connected to a link.

Further, the movable linkage further includes a universal joint at each end of the link, and the link is connected to the platform via the universal joint.

Further, each of the parallelly-connected joints is driven by m driving units, the total number of the driving units being m*N, the m driving units connected to the first joint being a first group of driving units, the m driving units connected to the second joint being a second group of driving units, and so on, the m driving units connected to the $N^{th}$ joint being an $N^{th}$ group of driving units, and the driving units having N groups in total.

Further, wherein a first platform of the first joint is connected to the driving base body, a second platform of the first joint is connected to a first platform of the second joint, and a second platform of the second joint is connected to a first platform of the third joint; a second platform of the $(N-1)^{th}$ joint is connected to a first platform of the $N^{th}$ joint, wherein the second platform of the first joint is fixedly connected to the first platform of the second joint to form a first platplate 1, and the second platform of the second joint is fixedly connected to a second platform of a third joint to form a platplate 2; . . . , the second platform of the $(N-1)^{th}$ joint is fixedly connected to a platform of the $N^{th}$ joint to form a platplate (N-1); or the second platform of the first joint and the first platform of the second joint are set as a same platplate 1, the second platform of the second joint and the first platform of the third joint are set as the same platplate 2, . . . , the second platform of the $(N-1)^{th}$ joint and a first platform of the $N^{th}$ joint are set as the same platplate (N-1).

Further, the driving unit is composed of a linear module and a motor, the linear module contains a lead screw and a sliding table, and the sliding table moves along the lead screw.

Further, the number of the linear modules is m times the number of parallel joints in the snake arm, the same as the total number of links in all parallel joints.

Further, the motor is a stepping motor with a brake or a decelerating stepping motor with a decelerator, the driving unit has a self-locking function, and the sliding table in the driving unit can immediately stop moving when the motor stalls or is power off.

Further, the steel wire rope is a sleeve steel wire rope provided with a sleeve outside and a steel wire rope inside, and the steel wire rope slides inside the sleeve.

Further, each platform has a central through-hole (231) in the center, and each platform has m steel wire rope through-holes (232) evenly distributed along the circumference; a head end of the sleeve of each sleeve steel wire rope (21) is connected to a base of the driving base body, a middle section of the sleeve steel wire rope (21) passes through the central through-hole of each platform, and a tail end of the sleeve steel wire rope (21) is connected to the steel wire rope through-hole (232) of the corresponding platform; each platform is only connected to the sleeves of m steel wire ropes driving the corresponding joints; after the sleeve steel wire rope passes through the steel wire rope through-hole (232), the tail end is connected to the link (242) of the joint driven thereby; and the sleeve steel wire ropes driving the other joints only pass through the central through-hole (231) of the platform.

Further, the steel wire rope to which the steel wire rope through-hole is connected is connected to a link diagonally thereto in the driven joint.

Further, the links are named in sequence according to the serial number names of the parallelly-connected joints, the links of the first joint are respectively links 1_1, 1_2, 1_3, . . . , 1_m, the links of the second joint are respectively links 2_1, 2_2, 2_3, . . . , 2_m, and the links of the $N^{th}$ joint are respectively links N_1, N_2, N_3, . . . , N_m, where the sleeve steel wire ropes are connected in such a manner that:

as for m sleeve steel wire ropes for driving the first joint, the head ends of the sleeves thereof are connected to the base of the driving base body, the tail ends of the sleeve thereof are connected to m steel wire rope through-holes of the platplate 0, the head ends of the steel wire ropes thereof are connected to a first group of driving units, and the tail ends of the steel wire ropes thereof pass through the m steel wire rope through-holes of the platplate 0, and are respectively connected to the links 1_1, 1_2, 1_3, . . . , 1_m of the first joint, and the distance between the position where the sleeve steel wire rope and the link are connected and the platplate 0 is $L_1$;

as for m sleeve steel wire ropes for driving the second joint, their sleeve head ends are connected to the base of the driving base body and tail ends are connected to m steel wire rope through-holes of the platplate 1, head ends of the steel wire ropes are connected to the second group of driving units, and the tail ends of the steel wire rope are respectively connected to the links 2_1, 2_2, 2_3, . . . , 2_m of the second joint, and the distance between the connection positions of the steel wire ropes and the link and the platform 1 is $L_2$;

and so on;

as for m sleeve steel wire ropes for driving the $N^{th}$ joint, head ends of the sleeves are connected to the base of the driving base body and tail ends are connected to m steel wire rope through-holes of the platform (N-1), the head ends of the steel wire rope thereof are connected to the $N^{th}$ group of driving units, the tail ends of the steel wire rope thereof are respectively connected to the links N_1, N_2, N_3, . . . , N_m of the $N^{th}$ joint, and the distance between the position where the steel wire rope and the link are connected and the platform (N-1) is $L_N$, wherein $L_1, L_2, \ldots, L_N$ are any constant values.

The present invention also provides a working method for a high-accuracy snake arm with large load and long-distance radiation resistance, where the above-mentioned snake arm is used to drive the first joint to move to a corresponding position through coordinated motion of a group of driving units connected to the first joint; a group of driving units connected to the second joint move cooperatively to drive the second joint to move to a corresponding position; and so on, a group of driving units connected to the $N^{th}$ joint move cooperatively to drive the $N^{th}$ joint to move to a corresponding position, and each group of the driving units move cooperatively to realize the motion of the snake arm.

The present invention has the following technical features:

1. The snake arm joint in the present invention is a parallelly-connected joint, where the parallelly-connected joint is connected in parallel by a plurality of groups of the same linkages, each group of linkages can serve as a support structure and has the same motion state, and the plurality of groups of linkages are connected in parallel so that the stress exerted by the parallelly-connected joint is relatively dispersed and the structure is more stable.

2. The parallelly-connected joint in the present invention is a spatial parallel mechanism, the platforms at two ends are always kept parallel, and one platform performs translation motion along a circle relative to the other platform, and after a plurality of joints are connected in series, the whole body of the snake arm can present a bending state, and can enter a narrow area by bypassing obstacles.

3. The parallelly-connected joints of the present invention have a simple and compact structure and have lightweight, and the length, size and number of the parallelly-connected joints can be changed according to practical requirements so as to adapt to different scenarios, and the snake arm can connect a plurality of joints in series to achieve long-distance operation.

4. In the present invention, the driving part of the snake arm is centrally placed, the snake arm is of a pure mechanical structure, the mechanical parts are all made of high-strength stainless steel, without any electronic components and other vulnerable devices, and can achieve radiation resistance and can be operated even in a radiation environment.

Compared with the prior art, the advantageous effects of the present invention are as follows:

1. Stronger load capacity. As a common rope-driven snake arm, a rotation joint thereof is a single hinge where stress exerted is concentrated, thus the joint is easy to break, and the load capacity is relatively weak; while for the snake arm provided by the present invention, the joint thereof is a parallelly-connected joint, and the stress exerted can be distributed to each link, and the stress exerted of each link is relatively small, so that the snake arm has a stronger load capacity;

2. Higher moving accuracy. For a normal rope-driven snake arm, a driving rope needs to have a joint itself as a support channel, and a rope driving a joint at the tail end needs to pass through each joint at the front end in turn and then be connected to a driving motor, so that when a certain joint moves in the middle, the ropes passing through the joint are affected, resulting in a correlation between the motions of each joint, and a coupling also exists in the driving of the joint; however, the present invention provides a snake arm using a sleeve steel wire rope to drive parallelly-connected joints, where the rope no longer uses a joint itself as a support channel, but has a sleeve as a support channel, and each rope has an independent sleeve with a certain length which does not change with the motion of the joints, so the motion between each joint is independent, and there is no coupling in the driving of the joints, which can reduce the complexity of joint motion control and improve the motion accuracy of the snake arm robot.

BRIEF DESCRIPTION OF DRAWINGS

The advantages of the above and/or additional aspects of the present invention will become apparent and easily understood by the following description of the embodiments taken in conjunction with the accompanying drawings, of which.

In the figure: 1—driving base body, 11—housing, 12—base board, 13—linear module, 131—sliding table, 132—motor, 2—snake arm, 21—sleeve steel wire rope, 22—fixed link, 23—fixed platform, 231—central through-hole, 232—steel wire rope through-hole, 24—movable linkage, 241, 243—universal joint, 242—link, 25, 26—movable platform.

DETAILED DESCRIPTION OF EMBODIMENTS

The technical solutions in the embodiments of the present invention will be clearly and completely described below with reference to the drawings in the embodiments of the present invention, and it is obvious that the described embodiments are only a part of the embodiments of the present invention, and not all of the embodiments. Based on the embodiments of the present invention, all other embodiments obtained by those of ordinary skill in the art without involving any inventive effort fall within the scope of protection of the Invention.

In the present invention, the terms "install", "connect with", "connect to", "fix", "front and back", "left and right", "inside and outside", "up and down" and the like are to be interpreted broadly on the basis of the device, for example, "connected" may be a fixed connection, may be a detachable connection, or may be integrally connected; "connect with" can be either directly or indirectly connected with something through an intermediary. The specific meaning of the above terms in the present invention can be understood by a person skilled in the art according to specific circumstances.

In the following embodiments of the present invention, a high-accuracy snake arm with large load and long-distance radiation resistance includes a driving base body and a snake shaped arm, where one end of the snake shaped arm is connected to the driving base body, and the other end can be connected to an end effector or be installed with other instruments and equipment; the driving base body is a centralized driving part; the snake shaped arm is a moving part; the snake shaped arm is composed of a plurality of parallelly-connected joints connected in series, and respectively referred to as a first joint, a second joint, . . . , and an $N^{th}$ joint according to the distance from the driving base body.

A parallelly-connected joint is a multi-link parallelly-connected mechanism, the number of links is m, and m is greater than or equal to 3, and can be formed by parallel connection of three identical linkages, such as a 3UU mechanism, where two ends each has a platform, and the platforms are respectively referred to as a platform A and a platform B according to the distance from the driving base body. According to the existing relevant theory, when one of the platforms, such as the platform A, is fixed, the platform B can perform spherical translational motion relative to the platform A, and the two platforms always remain to be parallel with each other.

The two ends of the linkage mechanism (multi-link parallelly-connected mechanism) each include a universal joint, the middle of linkage mechanism are links, and the links are named in a certain order according to the number names of parallelly-connected joints, the links of the first joint are respectively links 1_1, 1_2 and 1_3, the links of the second joint are respectively links 2_1, 2_2 and 2_3, and the links of the $N^{th}$ joint are respectively links N_1, N_2 and N_3.

The platform A of the first joint is connected to the driving base body, the platform B of the first joint is connected to the platform A of the second joint, and the platform B of the second joint is connected to the platform A of the third joint, . . . , the platform B of the $(N-1)^{th}$ joint is connected to the platform A of the $N^{th}$ joint, the platform B of the first joint and the platform A of the second joint can be the same platform or can be two different platforms fixedly connected in a known manner, and can be considered as a whole motion, and are considered as the same platform herein, and the platforms of each joint are respectively referred to as platplates 0, 1, 2, . . . , and N.

A plurality of driving units are installed in the driving base body, each driving unit is respectively connected to a link in a parallelly-connected joint via a steel wire rope, each of the parallelly-connected joints is driven by m driving units, the total number of the driving units being m*N, the m driving units connected to the first joint being referred to as a first group of driving units, the m driving units connected to the second joint being referred to as a second group of driving units, ..., the m driving units connected to the $N^{th}$ joint being referred to as an $N^{th}$ group of driving units, and the driving units having N groups in total.

The driving unit is composed of a linear module and a motor, wherein the linear module includes a lead screw and a sliding platform, the sliding platform moves on the lead screw, the motor is a stepping motor with a brake or a decelerating step motor with a decelerator, the driving unit has a self-locking function, and the sliding platform in the driving unit can immediately stop moving when the motor stalls or is power off.

The steel wire rope is a sleeve steel wire rope provided with a sleeve outside and a steel wire rope inside, and the steel wire rope can slide inside the sleeve, and the sleeve serves as a guide pipeline for the steel wire rope.

As for platforms 0, 1, 2, ..., and N, each platform has a large through-hole in the center, and m smaller steel wire rope through-holes are evenly distributed along the circumference of the large through-hole; a head end of the sleeve of the sleeve steel wire rope is connected to a base of the driving base body, a middle section of the rope passes through the central through-hole of each platform, and a tail end of the rope is connected to each platform; each platform is only connected to the m sleeve steel wires driving the joint, while the sleeve steel wires driving the other joints have no connection relationship with this platform and only pass through the centre of the platform.

The sleeve steel wire ropes are connected in such a manner that: as for m sleeve steel wire ropes for driving the first joint, the head ends of the sleeves thereof are connected to the base of the driving base body, the tail ends of the sleeve thereof are connected to m steel wire rope through-holes of the platform 0, the head ends of the steel wire ropes thereof are connected to the first group of driving units, and the tail ends of the steel wire ropes thereof are respectively connected to the links 1_1, 1_2 and 1_3 of the first joint, and the distance between the position where the sleeve steel wire rope and the link are connected and the platform 0 is $L_1$; as for m sleeve steel wire ropes for driving the second joint, their sleeve head ends are connected to the base of the driving base body and tail ends are connected to m steel wire rope through-holes of the platform 1, head ends of their steel wire ropes connected to the second group of driving units, and the tail ends of the steel wire rope respectively connected to the links 2_1, 2_2, and 2_3 of the second joint, and the distance between the connection positions of the steel wire ropes and the link and the platform 1 is $L_2$; ...; as for m sleeve steel wire ropes for driving the $N^{th}$ joint, their sleeve head ends are connected to the base of the driving base body and tail ends are connected to m steel wire rope through-holes of the platform (N−1), the head ends of the steel wire rope thereof are connected to the $N^{th}$ group of driving units, the tail ends of the steel wire rope thereof are respectively connected to the links N_1, N_2, and N_3 of the $N^{th}$ joint, and the distance between the position where the steel wire rope and the link are connected and the platform (N−1) is $L_N$.

The above-mentioned N is an integer greater than or equal to 1, $L_1, L_2, ..., L_N$ are any constant values, and an appropriate value can be selected according to actual situations; a snake arm robot works in the following manner: a first group of driving units connected to the first joint move cooperatively to drive the first joint to move to a corresponding position; a second group of driving units connected to the second joint move cooperatively to drive the second joint to move to a corresponding position, ..., m driving units connected to the $N^{th}$ joint move cooperatively to drive the $N^{th}$ joint to move to a corresponding position, and each group of the driving units move cooperatively to realize the motion of the snake arm.

Referred to FIGS. 1-5, a snake arm structure according to a preferred embodiment of the present invention is shown, wherein the high-accuracy snake arm with large load and long-distance radiation resistance includes a driving base body 1 and a snake shaped arm 2, where the driving base body 1 includes a housing 11, a base board 12 and a linear module 13, the linear module 13 is installed on the base board 12 which is connected to the snake shaped arm 2 via a fixed link 22, the other end of the fixed link 22 is connected to a fixed platform 23, and three identical movable linkages 24 are connected at one end to the fixed platform 23 and at the other end to a movable platform 25; three sleeve steel wire ropes 21 are connected at one end to a linear module 13, and at the other end to a movable linkage 24, and the movable linkage 24 is driven by the linear module 13 to realize the motion of the snake shaped arm 2.

Figure 1:
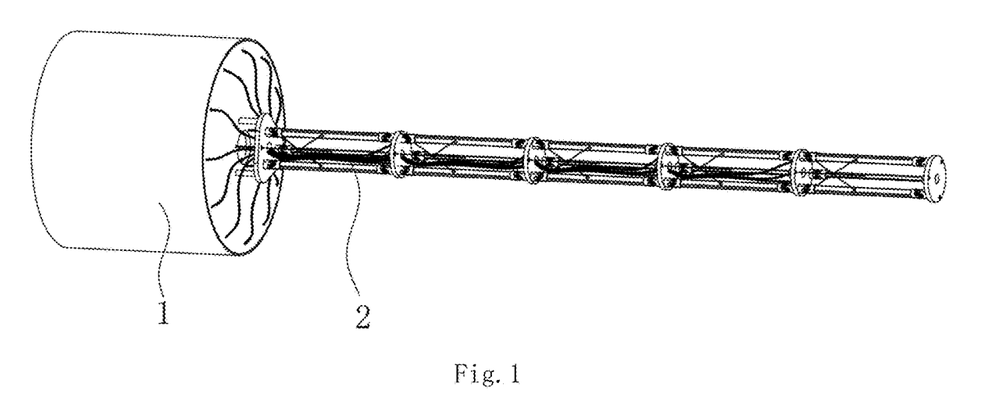
FIG. 1 is a structural schematic diagram showing a snake arm of the present invention in a straightened state.
Figure 2:
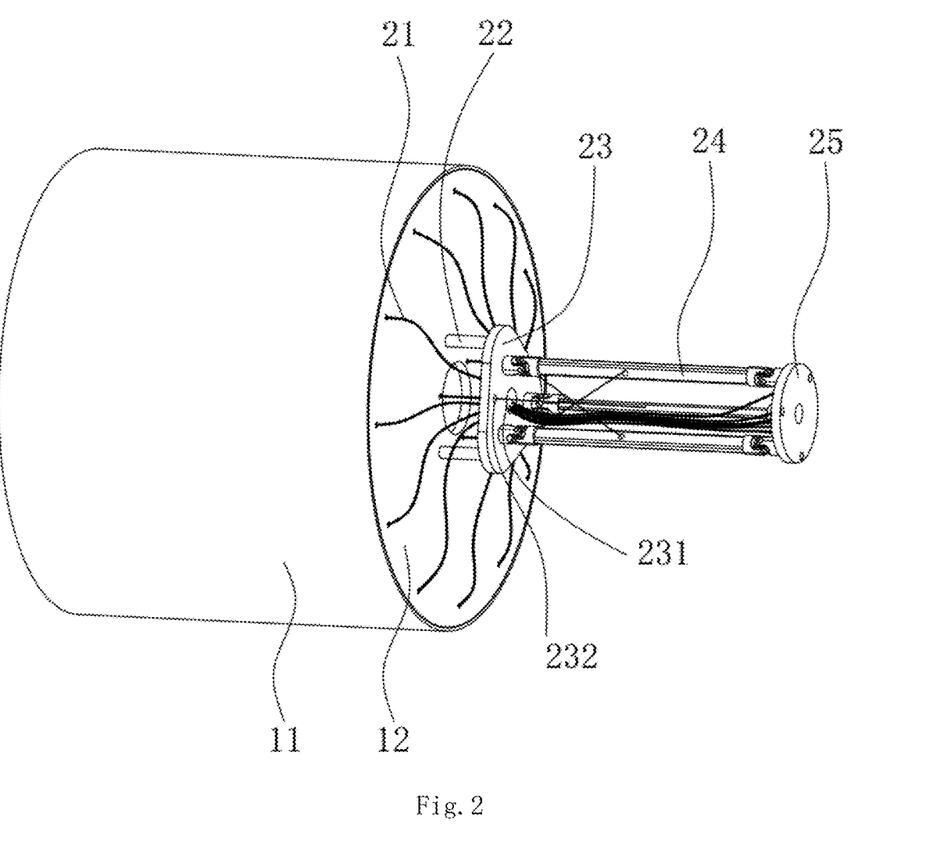
FIG. 2 is a local structural schematic diagram showing a snake arm of the present invention.

As shown in FIG. 2, in the present embodiment, three identical movable linkages 24 are connected in parallel between the fixed platform 23 and the movable platform 25, and the fixed platform 23, the movable linkages 24 and the movable platform 25 together constitute a parallelly-connected joint. The fixed platform 23 includes a central through-hole 231 and a circumferentially evenly distributed steel wire rope through-hole 232. The fixed platform 23 is connected to the base board 12 of the driving base body 1 via three fixed links 22. Three sleeve steel wire ropes 21 are used for driving parallel joints, wherein one end of the sleeve is installed on the base board 12, and the other end of the sleeve is installed on a steel wire rope through-hole 232 of the fixed platform 23; two ends of the steel wire rope inside the sleeve steel wire rope 21 respectively extend, and one end is connected to the linear module 13, and the other end is connected to the movable linkage 24; and the remaining sleeve steel wire ropes pass through the central through-hole 231 and are connected to the next parallel joint.

Figure 3:
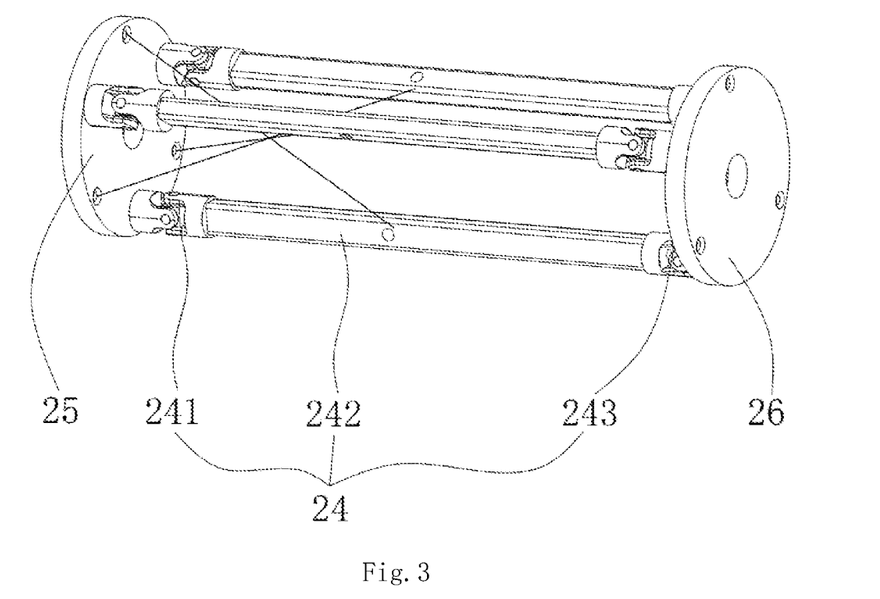
FIG. 3 is a structural schematic diagram showing a parallelly-connected joint of the present invention.

FIG. 3 is a schematic diagram showing a parallelly-connected joint in the present embodiment, including a first platform 25, three identical movable linkages 24 and a second platform 26, where two ends of the movable linkage 24 are respectively connected to the first platform 25 and the second platform 26, a triangle formed by the connection points thereof is an equilateral triangle, and two ends of the movable linkage 24 respectively include a first universal joint 241 and a second universal joint 243, and the two universal joints are connected via a link 242. The first platform 25 includes a central through-hole 231 and a steel wire rope through-hole 232 uniformly distributed circumferentially, and the center of the steel wire rope through-hole 232 is located on a corner bisector of an equilateral triangle composed of the above-mentioned platform connection points. The distribution of the central through-holes and the steel wire rope through-holes on the second platform 26 is the same as that of the first platform 25, and the second platform 26 can be obtained by spatial translation of the first platform 25. The steel wire rope to which the steel wire rope through-hole 232 is connected is connected to the link 242 diagonally thereto for driving parallelly-connected joint motion. As this parallelly-connected joint moves, the platform 26 moves in a spherical translation relative to the platform 25, and the platform 26 is always parallel to the platform 25.

Figure 4:
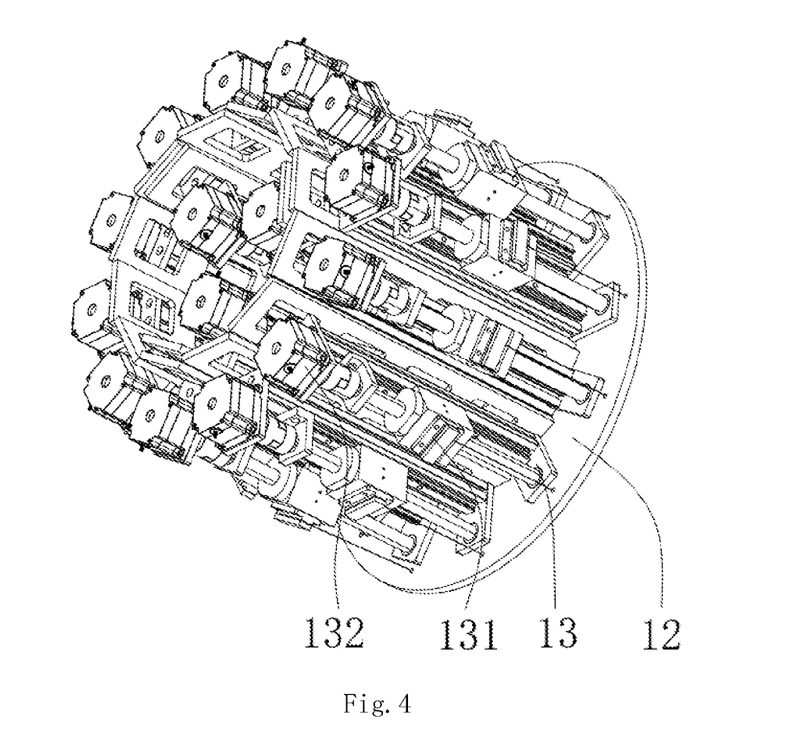
FIG. 4 is a structural schematic diagram showing the inside of the driving base body of the present invention.

As shown in FIG. 4, it is a structural schematic diagram inside the driving base body in the present embodiment, the linear module 13 is installed on the base board 12 and includes a sliding table 131 and a motor 132, wherein the sliding table 131 is connected to the steel wire rope, the motor 132 drives the movement of the sliding table 131, the sliding table 131 drives the steel wire rope to pull the link on the parallelly-connected joints to move, and the three linear modules cooperate to move to pull the link on the corresponding parallel joints to realize the motion of the parallelly-connected joints. The number of linear modules 13 is three times the number of parallel joints in the snake arm, the same as the total number of links in all parallel joints.

Figure 5:
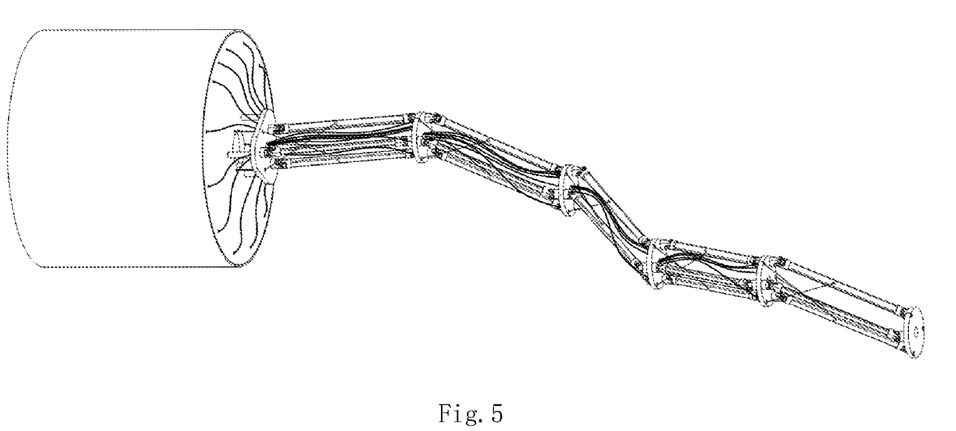
FIG. 5 is a structural schematic diagram showing a snake arm according to the present invention in a bent state.

FIG. 5 is a schematic illustration of the parallelly-connected joints of the present embodiment when bent, with each joint moving to a different position, allowing the tail end joint to reach a position in space.

The snake arm of the present invention can be applied to different scenarios by varying the number of parallelly-connected joints and the length, spacing, etc. of the linkages 242 in the parallelly-connected joints;

Finally, it should be noted that: while the present invention has been described in detail with reference to the foregoing embodiments, it will be understood by a person skilled in the art that various changes in form and details may be made therein without departing from the spirit and scope of the present invention. Any modification, equivalent replacement, or improvement made within the spirit and principle of the present invention should be included in the protection scope of the present invention.

What is claimed is:

1. A high-accuracy snake arm with large load and long-distance radiation resistance, comprising a driving base body and a snake shaped arm, wherein one end of the snake shaped arm is connected to the driving base body, and the snake shaped arm is composed of parallelly-connected joints connected in series, which are respectively referred to as a first joint, a second joint, . . . , and an $N^{th}$ joint according to their distance from the driving base body, wherein N is an integer greater than or equal to 1;

each parallelly-connected joint comprises m identical movable linkages connected in parallel, and m is an integer greater than or equal to 3;

each of the parallelly-connected joints further comprises platforms respectively connected to each end of the m identical movable linkages connected in parallel; where one of the platforms at one end of the m identical movable linkages connected in parallel is fixed relative to another platform, the other platform performs translation motion along a circle relative to the fixed platform, two adjacent platforms remain to be parallel with each other; and the driving base body have a plurality of driving units installed therein, each driving unit is respectively connected to a respective link in the parallelly-connected joint via a steel wire rope, and each steel wire rope is connected to a respective link.

2. The high-accuracy snake arm with large load and long-distance radiation resistance according to claim 1, wherein the movable linkage further comprises two universal joints, each universal joint mounted at each end of the link, and the link is connected to the platform via the universal joints.

3. The high-accuracy snake arm with large load and long-distance radiation resistance according to claim 1, wherein each of the parallelly-connected joints is driven by m driving units, the total number of the driving units being m*N, the m driving units connected to the $N^{th}$ joint used as an $N^{th}$ group of driving units, and the driving units having N groups in total.

4. The high-accuracy snake arm with large load and long-distance radiation resistance according to claim 1, wherein a first platform of the first joint is connected to the driving base body, a second platform of the first joint is connected to a first platform of the second joint, and a second platform of the second joint is connected to a first platform of the third joint; a second platform of the $(N-1)^{th}$ joint is connected to a first platform of the $N^{th}$ joint, wherein the second platform of the $(N-1)^{th}$ joint is fixedly connected to a platform of the $N^{th}$ joint to form a platplate (N-1); or the second platform of the $(N-1)^{th}$ joint and a first platform of the $N^{th}$ joint are set as the same platplate (N-1).

5. The high-accuracy snake arm with large load and long-distance radiation resistance according to claim 1, wherein the driving unit is composed of a linear module and a motor, wherein the linear module contains a lead screw and a sliding table, and the sliding table moves along the lead screw.

6. The high-accuracy snake arm with large load and long-distance radiation resistance according to claim 1, wherein the number of the linear modules is m times the number of parallel joints in the snake arm, the same as the total number of links in all parallel joints.

7. The high-accuracy snake arm with large load and long-distance radiation resistance according to claim 1, wherein the motor is a stepping motor with a brake or a decelerating stepping motor with a decelerator, the driving unit has a self-locking function, and the sliding table in the driving unit can immediately stop moving when the motor stalls or is power off.

8. The high-accuracy snake arm with large load and long-distance radiation resistance according to claim 1, wherein each platform has a central through-hole in the center, and each platform has m steel wire rope through-holes evenly distributed along the circumference; a head end of a sleeve of each sleeve steel wire rope is connected to a base of the driving base body, a middle section of the sleeve steel wire rope passes through the central through-hole of each platform, and a tail end of the sleeve steel wire rope is connected to the steel wire rope through-hole of the corresponding platform; each platform is only connected to sleeves of m steel wire ropes driving the corresponding joints; after the sleeve steel wire rope passes through the steel wire rope through-hole, the tail end is connected to the link of the joint driven thereby; and the sleeve steel wire ropes driving other joints only pass through the central through-hole of the platform.

9. The high-accuracy snake arm with large load and long-distance radiation resistance according to claim 8, wherein the links are named in sequence according to the serial number names of the parallelly-connected joints, the links of the first joint are respectively links 1_m, the links of the second joint are respectively links 2_1, 2_2, 2_3, . . . , 2_m, and the links of the $N^{th}$ joint are respectively links N_1, N_2, N_3, . . . , N_m, wherein the sleeve steel wire ropes are connected in such a manner that:

as for m sleeve steel wire ropes for driving the $N^{th}$ joint, head ends of the sleeves are connected to the base of the driving base body and tail ends are connected to m steel wire rope through-holes of the platform (N-1), the head ends of the steel wire rope thereof are connected to the $N^{th}$ group of driving units, the tail ends of the steel wire rope thereof are respectively connected to the links N_m of the $N^{th}$ joint, and the distance between the position where the steel wire rope and the link are connected and the platform (N−1) is $L_N$, wherein $L_1$, $L_2$, . . . , $L_N$ are any constant values.

10. A method for operating a high-accuracy snake arm with large load and long-distance radiation resistance according to claim 1,
- wherein a group of driving units connected to the $N^{th}$ joint move cooperatively to drive the $N^{th}$ joint to move to a corresponding position,
- and each group of the driving units move cooperatively to realize the motion of the snake arm.

* * * * *